UNITED STATES PATENT OFFICE.

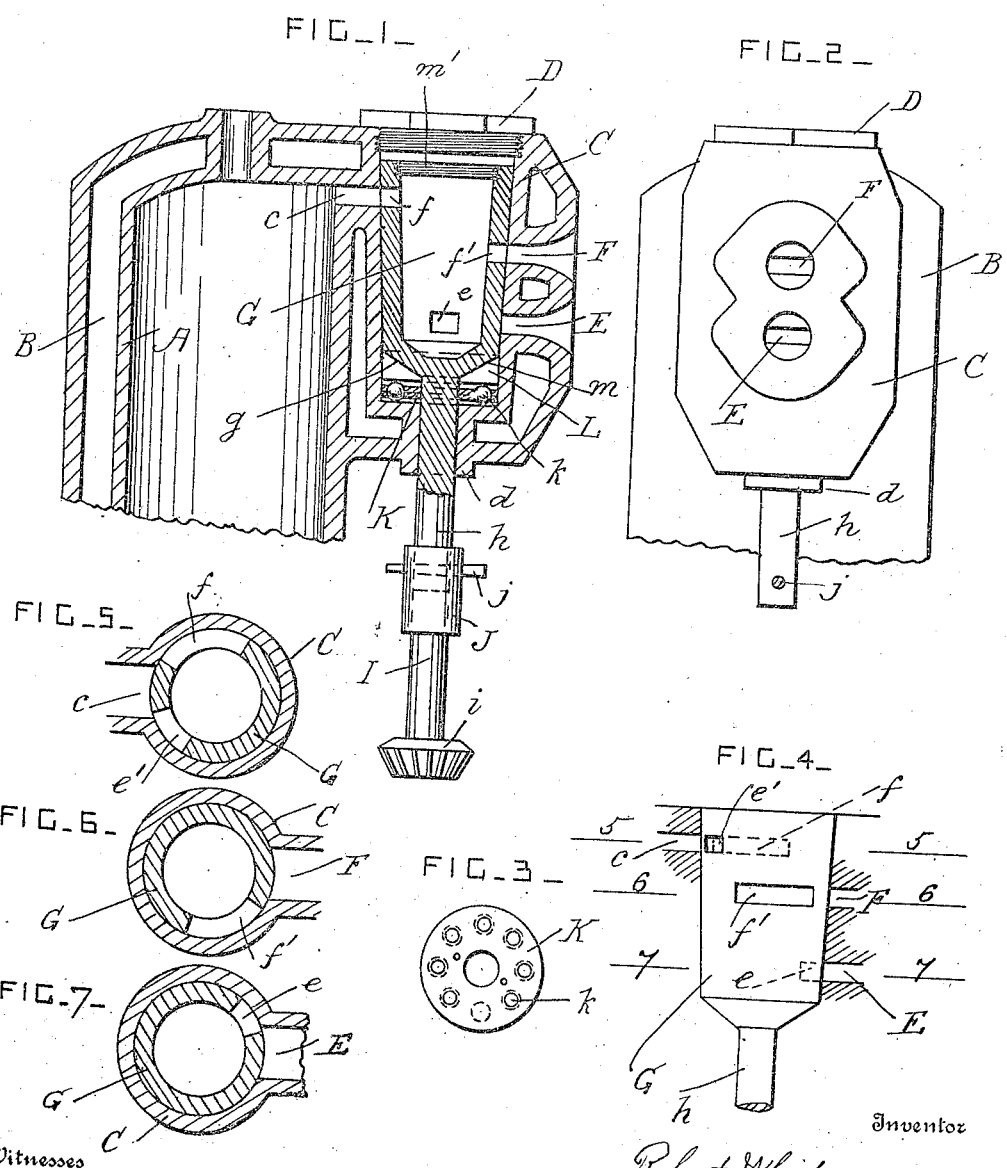

ROBERT WHITE, OF BEAVER FALLS, PENNSYLVANIA, ASSIGNOR OF ONE-HALF TO E. S. BURNS, OF BEAVER FALLS, PENNSYLVANIA.

VALVE FOR GAS-ENGINES.

957,285.   Specification of Letters Patent.   Patented May 10, 1910.

Application filed May 19, 1909. Serial No. 496,976.

*To all whom it may concern:*

Be it known that I, ROBERT WHITE, a citizen of the United States, residing at Beaver Falls, in the county of Beaver and State of Pennsylvania, have invented certain new and useful Improvements in Valves for Gas-Engines; and I do hereby declare the following to be a full, clear, and exact description of the invention, such as will enable others skilled in the art to which it appertains to make and use the same.

This invention relates to the regulating valves of gas and gasolene engines; and it consists in the novel construction and combination of the parts as hereinafter fully described and claimed.

In the drawings, Figure 1 is a vertical section of a portion of an engine provided with a rotary valve according to this invention. Fig. 2 is a side view of a portion of the engine cylinder and the valve casing. Fig. 3 is a plan view of the valve support. Fig. 4 is a side view of the valve showing it at the commencement of the intake stroke. Figs. 5, 6, and 7, are cross-sections taken on the lines 5—5, 6—6, and 7—7, in Fig. 4, showing the relative positions of the ports at the commencement of the intake stroke. In Fig. 1 the parts are shown in their positions at a part of the exhaust stroke.

A is a portion of the power cylinder of a gas or gasolene engine, and B is a portion of its water-jacket.

C is the casing of the regulating valve, and $c$ is the main port which connects the upper part of the valve-chamber with the upper end portion of the cylinder. The valve-chamber of the casing is conical in form and its larger end is arranged uppermost.

D is a cap or cover which closes the larger end of the valve-chamber, and $d$ is a bearing for the valve-spindle arranged on the axis of the valve-chamber and at the lower end thereof.

E is the inlet port and F is the outlet port of the valve-chamber. These ports are arranged at different levels from the port $c$, and from each other, and at the opposite side of the valve-casing from the port $c$, and the outlet port F is arranged above the inlet port E.

G is the valve which is conical in form, and which is journaled in the valve-casing C so as to revolve freely. The valve G is hollow and it has a conical bottom portion $g$, and a driving-spindle $h$. The driving-spindle $h$ is journaled in the bearing $d$, and it projects at the lower end of the valve-casing.

I is the driving-shaft supported in any approved bearings and provided with a beveled toothed wheel $i$ or other suitable means for revolving it continuously.

J is a coupling provided with a tapered pin $j$ of soft metal which connects the shaft I with the valve-spindle $h$, and which pin is sheared off whenever the valve sticks or seizes in its chamber, so that no damage is done.

K is a bearing plate provided with a series of antifriction balls $k$ and arranged below the valve on the bottom of the valve-casing around the valve-spindle.

L is an expansion washer of white metal which rests on the balls $k$, and which is provided on its upper side with a conical recess $m$, which receives the conical bottom portion $g$ of the valve. The valve revolves the washer L by frictional contact. The washer L is formed of an alloy of tin, zinc and aluminum, in suitable proportions, and it is arranged so that it expands to a greater extent than the valve and valve-casing when subjected to the same degree of heat. When the valve becomes hot and inclined to stick in its casing, it is raised to a slight extent in the chamber by the expansion of the washer L, and is thereby prevented from sticking.

The valve G is provided on one side with an inlet port $e$ and an outlet port $f$, and it is provided on its other side with an inlet port $e'$ and an outlet port $f'$. The outlet port $f$ and the inlet port $e'$ are arranged on a level with the cylinder main port $c$, and at the upper part of the valve. The inlet port $e$ is arranged on a level with the inlet port E; and the outlet port $f'$ is arranged on a level with the outlet port F. The inlet port E and the outlet port F are connected with suitable supply and exhaust pipes, respectively, but not shown in the drawings. The upper end of the valve G is closed by a cap or plate $m'$.

When the valve is revolved a mixture of air with inflammable gas or vapor flows through the ports $e$, $e'$ and $c$ into the cylinder. When this charge has been ignited in the cylinder, and has propelled the piston therein, the valve has been revolved one-half of a revolution, and the products of combustion are exhausted through the ports $c$, $f$ and $f'$, which are then placed in communication.

What I claim is:

1. The combination, with a cylinder and a valve-casing having a main port between them, the said valve-casing having also an inlet port and an outlet port on the opposite side of it from the said main port and at different levels from the main port and from each other; of a hollow rotary valve journaled in the said valve-casing and provided at opposite sides with ports which place the main port in communication with the said inlet and outlet ports alternately as the valve is revolved.

2. The combination, with a cylinder and a conical valve-casing having a main port between them and at the larger end portion of the said casing, the said valve-casing having also an inlet port and an outlet port on the opposite side of it from the said main port, said inlet port being arranged at the smaller end portion of the casing and the said outlet port at its middle part; of a hollow and conical rotary valve journaled in the said valve-casing and provided at opposite sides with ports which place the said main port in communication with the said inlet and outlet ports alternately as the valve is revolved.

3. The combination, with a cylinder and a conical valve-casing having a main port between them, of a hollow and conical rotary valve journaled in the said casing, said casing and valve being provided with inlet and outlet ports which are placed in communication alternately with the said main port as the valve is revolved; of an expansion washer of white metal arranged between the smaller ends of the said valve and its casing and operating to move the valve longitudinally when the parts become heated.

4. The combination, with a cylinder and a conical valve-casing having a main port between them, of a hollow and conical rotary valve journaled in the said casing, said casing and valve being provided with inlet and outlet ports which are placed in communication alternately with the said main port as the valve is revolved; of an expansion washer of white metal arranged between the smaller ends of the said valve and its casing and operating to move the valve longitudinally when the parts become heated, and a bearing-plate provided with antifriction devices and supporting the said expansion washer and valve in the valve-casing.

In testimony whereof I have affixed my signature in the presence of two witnesses.

ROBERT WHITE.

Witnesses:
EARL R. LEYDA,
ROLAND GASKELL.